D. A. LITTLE AND E. F. MARCHA.
PUNCTURE PROOF AND BLOWOUT PROOF DEVICE FOR PNEUMATIC CASINGS.
APPLICATION FILED APR. 10, 1920.
1,414,328. Patented Apr. 25, 1922.
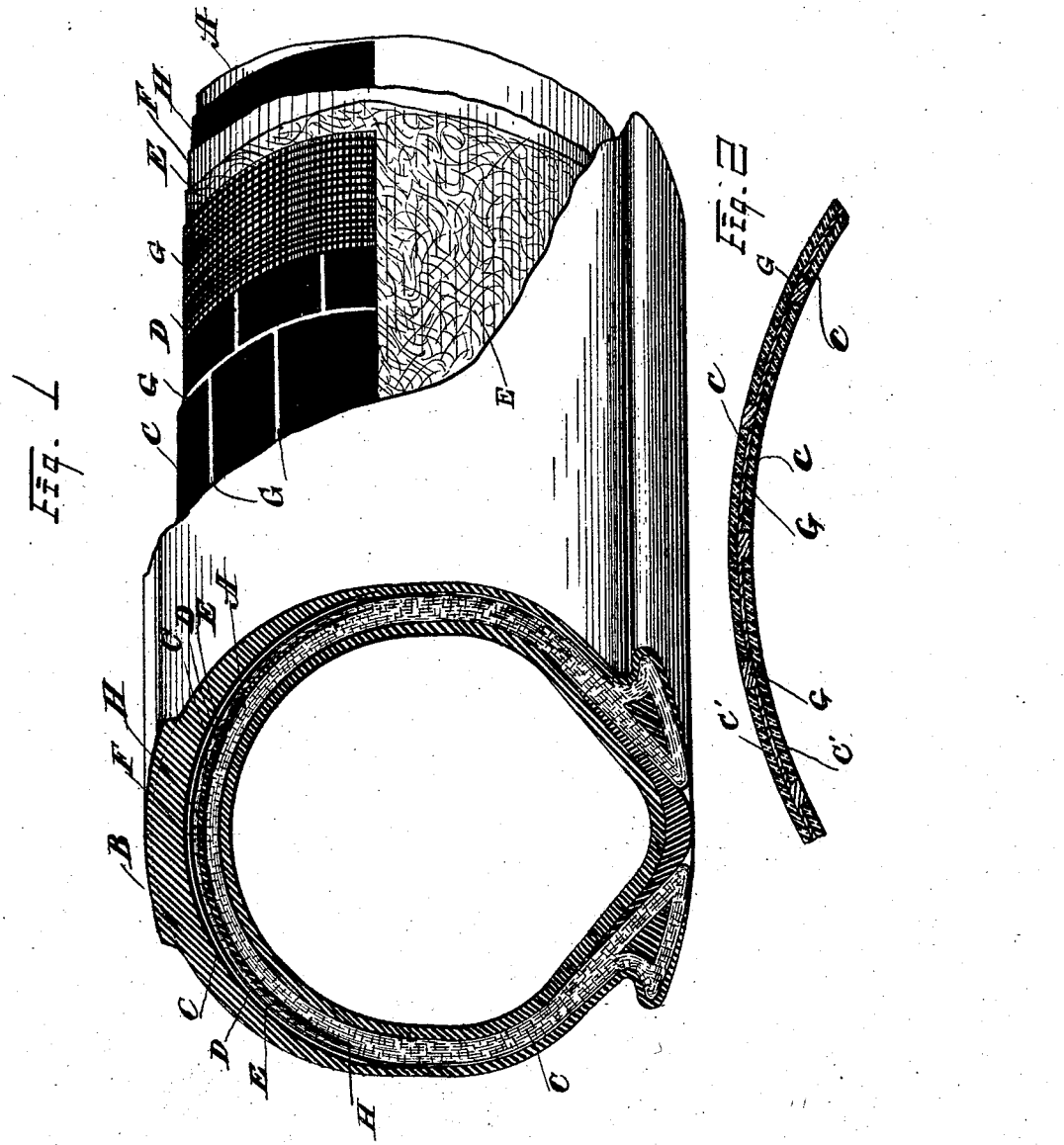

UNITED STATES PATENT OFFICE.

DAVID A. LITTLE AND ERNEST F. MARCHA, OF CLEVELAND, OHIO, ASSIGNORS TO THE PARAMOUNT CORD TIRE COMPANY, OF CLEVELAND, OHIO.

PUNCTURE-PROOF AND BLOW-OUT-PROOF DEVICE FOR PNEUMATIC CASINGS.

1,414,328. Specification of Letters Patent. Patented Apr. 25, 1922.

Application filed April 10, 1920. Serial No. 372,960.

*To all whom it may concern:*

Be it known that we, DAVID A. LITTLE and ERNEST F. MARCHA, citizens of the United States, and residents of Cleveland, in the county of Cuyahoga and State of Ohio, have invented certain new and useful Improvements in Puncture-Proof and Blow-Out-Proof Devices for Pneumatic Casings, of which we hereby declare the following to be a full, clear, and exact description, such as will enable others skilled in the art to which it appertains to make and use the same.

The objects of the invention are to provide the casing of a pneumatic tire with means for preventing the penetration of heat due to the friction of the tire upon the road bed into the substance of the casing, which causes expansion of the air within the casing and the consequent over inflation of the tire.

It is also designed to prevent the loosening or separating of the breaker strip within the tread side of the casing, resulting from the irregular expansion and contraction of the parts due to alternate over heating and subsequent cooling which action tends to destroy the continuity of the casing and permits blow-outs to occur.

The invention also includes means for resisting punctures from glass, tacks, nails or other small pointed objects upon the road bed that the casing might encounter.

It includes also a separate cushioning means, or cushioning member enclosed between the outer fabric layers of the casing and preferably enclosed between the breaker strip or an outer layer of the carcass, and the carcass itself, to relieve the fabric of which the casing is composed, from stress and strain resulting from the constant expansion and contraction of the parts of the casing as it is propelled rapidly over the road bed.

The invention comprises a compound breaker strip enclosed in the tread side of the casing in which are embodied layers having the following utilities and capabilities.

One layer, the outer one, is composed of vulcanizable, tough and flexible material, such as semi-hard rubber, which is capable of resisting punctures from small sharp objects; the next layer is composed of an open mesh fabric impregnated or frictioned with rubber, which adheres thereto and fills all the openings, and a third layer composed of rubber coated asbestos, or other flexible heat resisting material. The invention also comprises a rubber layer or cushion imbedded more deeply in the casing, and designed to prolong the life of the carcass by absorbing the shocks due to the strains while the casing is in motion.

The invention is herein more fully described, shown in the accompanying drawings and specifically pointed out in the claims. Fig. 1 is a transverse section of the device.

Fig. 2 is an enlarged section of the preferred form of puncture resisting layer.

In these views A, is the fabric carcass composed of cord duck or other well known fabric, B is the tread side composed of rubber.

Intermediate of these parts is shown the compound breaker strip formed in layers, C, D, and E, which are vulcanized together and to the carcass and tread portions respectively. The outer layer C is composed of semi-hard puncture resisting vulcanizable material, which is also sufficiently tough and flexible to permit its bending freely without breaking. Immediately beneath this layer is shown the rubber coated open fabric D; the spaces in which are filled also with rubber, thus permitting a perfect union with the other layers. The inner layer E is formed of a sheet of asbestos which is coated with rubber at G on both sides and unites with the layer D, and with the upper layer F of the carcass beneath.

This asbestos sheet resists the transmission of heat to the carcass and inner tube and prevents the expansion of air and consequent over inflation of the tire. The layers C and D of the breaker strip, transversely connect the tread sides of the casing, to prevent puncture thereof, and the asbestos strip is wider than the other layers and extends substantially to the beads or rim edges of the casing.

The intermediate fabric layer D of the breaker strip is flexible and permits free action of the hard outer layer and while adding tensile strength to the breaker strip, serves to unite the outer and inner layers.

Beneath the asbestos layer is shown the inner cushion H of soft rubber, which is preferably positioned also beneath the outer layer of fabric of the carcass, thus keeping the laminations apart and permitting free movement thereof upon each other without danger of their tearing apart, and giving also, greater resiliency to the carcass.

After all the parts are assembled and pressed tightly together, they are vulcanized in place.

When the tire is inflated the layer of semi-hard rubber is resilient and has a tendency to yield and turn aside any sharp object against which it may strike before it can be punctured.

In Fig. 2, the puncture proof or puncture resisting layer is shown composed of two plies, and each ply is composed of a multiple number of continuous annular bands C' spaced apart and embedded in soft rubber G, the bands in one ply overlapping the bands in the other ply, and soft rubber filling all the spaces between their edges.

The advantages of this construction are to give increased resiliency to the puncture resisting members in order to accommodate them to the movements of the other portions of the casing, caused by the alternate expansion and contraction thereof.

Having described the invention, what we claim as new and desire to secure by Letters Patent is:—

1. A puncture resisting member for a pneumatic casing comprising, a two ply layer composed of spaced annular bands of flexible puncture resisting vulcanizable material, the bands in one ply overlapping the bands in the other ply, and a filling of soft rubber connecting the adjoining faces and edges of said bands.

2. In a casing, a puncture-resisting layer, comprising an outer layer, composed of parallel annular bands of hard, flexible, vulcanizable material, an inner layer composed of parallel annular bands of hard flexible vulcanizable material, said bands in overlapping staggered relation to each other, an intermediate layer of soft rubber, enveloping the edges of said hard layers, and a fabric layer impregnated with rubber and vulcanized to said above mentioned layers.

3. In a casing, a puncture-resisting member comprising annular parallel bands of a hard vulcanizable material, a closely adjoining layer of annular parallel bands of hard vulcanizable material, and an intermediate layer of soft rubber, said intermediate layer filling the annular spaces between said bands, the bands in said layers arranged in overlapping relation to each other, and vulcanized to said intermediate layer.

In testimony whereof, we hereunto set our hands this 16" day of March, 1920.

DAVID A. LITTLE.
ERNEST F. MARCHA.

In presence of—
S. W. SANGSTER,
WM. M. MONROE.